United States Patent

[11] 3,586,261

[72] Inventors T. O. Paine
Acting Administrator of the National Aeronautics and Space Administration in respect to an invention of;
David N. Lovinger, Minnetonka, Minn.

[21] Appl. No. 802,948
[22] Filed Feb. 27, 1969
[45] Patented June 22, 1971

[54] VOICE OPERATED CONTROLLER
9 Claims, 11 Drawing Figs.

[52] U.S. Cl. .......... 244/1, 179/1, 244/83
[51] Int. Cl. .......... B64g 1/00, B64c 13/04
[50] Field of Search .......... 179/1 SA, 1, 1 VC; 178/31; 244/1, 1 SS, 77, 77 SS, 83

[56] References Cited
UNITED STATES PATENTS
3,106,371 10/1963 Brannin et al. .......... 244/77 X
3,225,141 12/1965 Dersch .......... 179/1 (AS)
3,286,031 11/1966 Gedeles .......... 179/1 (VC)
OTHER REFERENCES
Locke; J. K., Machines that Listen, Electronics Illustrated, Mar. 1964, pp. 33,34,38,103 and 119

*Primary Examiner*—Milton Buchler
*Assistant Examiner*—Jeffrey L. Forman
*Attorneys*—G. T. McCoy, Howard J. Osborn and William H. King

ABSTRACT: This disclosure describes a voice operated controller for controlling the reaction jets of a space vehicle. A voice recognition apparatus is connected to a control. The control is connected to, and controls, the reaction jets. The voice recognition apparatus generates pulses in accordance with received voice commands. These pulses are applied to the control which interprets them. The control then applies suitable control signals to the reaction jets so that the desired command is carried out.

INVENTOR.
DAVID N. LOVINGER
BY
William H. King
ATTORNEYS

INVENTOR.
DAVID N. LOVINGER
BY
William H. King
ATTORNEYS

INVENTOR.
DAVID N. LOVINGER

BY [signature]
William H. King
ATTORNEYS

INVENTOR.
DAVID N. LOVINGER
BY
William H. King
ATTORNEYS

INVENTOR.
DAVID N. LOVINGER
BY
William H. King
ATTORNEYS

VOICE OPERATED CONTROLLER

BACKGROUND OF THE INVENTION

As manned space vehicles become more and more complex and are required to perform more and more complex maneuvers, they require control systems that use less and less of the pilot's time. That is, as manned space vehicles become more complex, their pilots are required to perform more tasks. Hence, the pilot can spend less time maneuvering the vehicle. In addition, the maneuvers that must be performed become more complex. And, complex maneuvers require a more precise control system. Hence, the overall control system must become less complex so that the pilot can spend less time maneuvering while at the same time the system must become more precise so that more complex maneuvers can be performed.

Therefore, it is an object of this invention to provide a new and improved control system.

It is also an object of this invention to provide a new and improved maneuvering control system suitable for use with a space vehicle.

It is a still further object of this invention to provide a maneuvering control system for use with a space vehicle that is rapid acting and more precise than prior art control systems.

SUMMARY OF THE INVENTION

In accordance with a principle of this invention, a voice operated controller for controlling the maneuvering of a space vehicle is provided. The controller comprises a voice recognizer for recognizing voice commands and for generating pulses in accordance with those commands and a control for interpreting the pulses from the voice recognizer. The control generates control signals which are applied to, and control, the reaction jets of the space vehicle.

In accordance with a further principle of this invention, the voice recognizer recognizes voice commands of both a rotational and a translational nature. In addition, the voice recognizer recognizes both positive and negative commands of a rotational and a translational nature. The voice recognizer generates output pulses for these commands which are interpreted by the control.

In accordance with a still further principle of this invention, stop and cage command signals can be generated at any time and are recognized by the voice recognizer. The voice recognizer generates pulses for these signals which are utilized to stop and cage the reaction jets after suitable interpretation by the control.

It will be appreciated from the foregoing summary of the invention that a rather uncomplicated apparatus for controlling the maneuvering of a space vehicle is provided. The apparatus can be carried out in digital form by utilizing flip-flops along with AND and OR gates, to interpret the pulses from the voice recognizer and to control the reaction jets. The controller requires less operating time than prior art space vehicle controllers, because the pilot must merely speak a particular command signal to cause the desired vehicle operation. In addition, because the actual control of the reaction jets is through an electronic control system, the overall system is more precise than prior art control systems.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
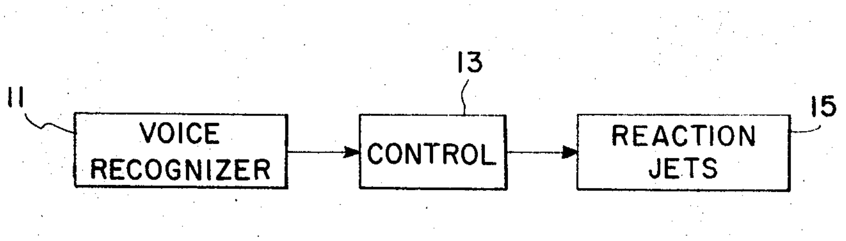
FIG. 1 is a block diagram of the invention.

FIG. 1 illustrates a preferred embodiment of the invention and comprises: a voice recognizer 11; a control 13; and reaction jets 15. The voice recognizer may be any one of the various types that are known in the art; it merely interprets certain voice commands and generates output pulses in accordance with these commands. The output of the voice recognizer is connected to the input of the control which is hereinafter described. The control interprets the pulse output from the voice recognizer 11 and generates control signals. The control signals from the control 13 are applied to the reaction jets. The reaction jets are basically a plurality of jets mounted on the exterior of the spacecraft. The jets are mounted so that the spacecraft may be moved in rotation about yaw, pitch and roll axes, singly or in combination. In addition, reaction jets are appropriately mounted so that the spacecraft can be moved in translation along the X, Y or Z axes. The mounting of reaction jets for this type of movement is well known in the art; hence, it will not be discussed here.

Figure 2:
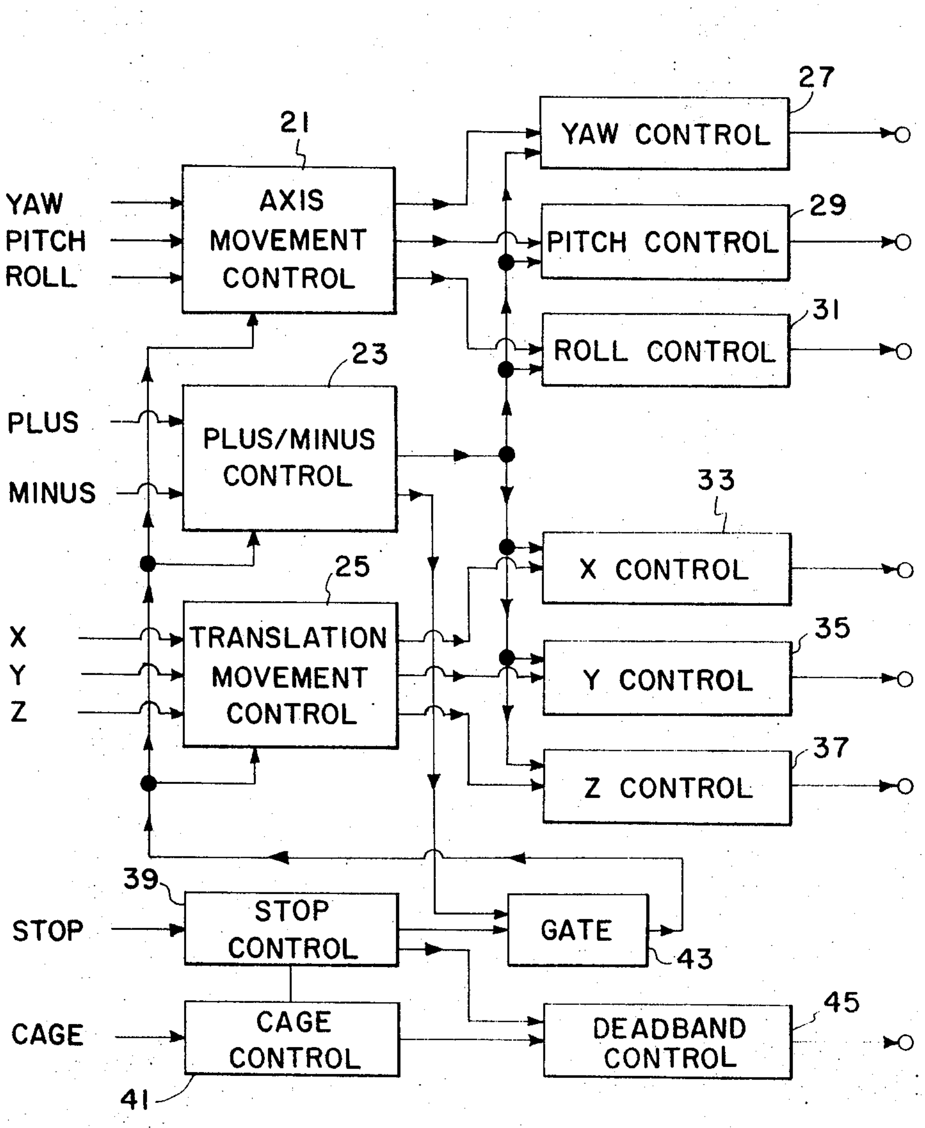
FIG. 2 is a block diagram of a control suitable for use with the invention.

FIG. 2 illustrates a control suitable for interpreting the pulses generated by the voice recognizer and for generating control signals for controlling the reaction jets. The control illustrated in FIG. 2 comprises: an axis movement control 21; a plus/minus control 23, a translation movement control 25; a yaw control 27; a pitch control 29; a roll control 21; an X control 33; a Y control 35; a Z control 37; a stop control 39; a cage control 41; a gate 43; and, a deadband control 45.

The voice recognizer in the illustrated embodiment of the invention is adapted to recognize the following commands: yaw, pitch, roll, plus, minus, X, Y, Z, stop and cage. For each of these different commands, a pulse is generated on a different output line of the voice recognizer 11. The yaw, pitch and roll command pulses are applied to the axis movement control 21. The plus and minus command pulses are applied to the plus/minus control 23. The X, Y and Z command pulses are applied to the translation movement control 25. The stop command pulse is applied to the stop control 39 and the cage command pulse is applied to the cage control 41.

The axis movement control 21 generates three outputs: one output is connected to the yaw control 27, the second output is connected to the pitch control 29, and the third output is connected to the roll control 31. The translation movement control 25 generates three output signals: one output signal is connected to the X control 33, the second output signal is connected to the Y control 35, and the third output signal is connected to the Z control 37.

The plus/minus control generates outputs on two lines. One line is connected to second inputs of the yaw control, the pitch control, the roll control, the X control, the Y control, and the Z control. The second output of the plus/minus control is connected to one input of the gate 43. The gate generates an output signal that is applied to a separate input of the axis movement control 21, the plus/minus control 23, and the translation movement control 25 for purposes hereinafter described. The stop control generates three outputs: one is applied to the input of the cage control, the second is applied to an input of the deadband control 45, and the third is applied to a second input of the gate 43. The cage control 41 generates an output signal that is connected to a second input of the deadband control 45.

The yaw control generates an output signal that is adapted to control the yaw rotation control jets by opening and closing a jet valve, for example. The pitch control generates an output signal that is adapted to control the pitch rotational control jets. And, the roll control generates an output signal that is adapted to control the roll rotational control jets.

The X control generates an output signal that is adapted to control X translation movement jets. The Y control generates an output signal that is adapted to control Y translation movement jets. The Z control generates an output signal that is adapted to control Z translation movement jets.

Turning now to a description of the general operation of the control illustrated in FIG. 2, a typical command would be "yaw-yaw-yaw-plus." This command causes the axis control 21 to generate an output signal and apply it to the yaw control 27. In addition, the plus/minus control generates a plus output signal and applies it to the yaw control 27. Hence, the yaw control 27 generates an output signal that is applied to the appropriate reaction jets to cause a yaw movement in the positive direction. Since there is more than one "yaw" command (specifically, three, in this example), the command could represent a high speed movement in the positive yaw direction. Similarly, if it was desired to move slowly in the negative X translation direction, the command sequence could be X-minus. For this sequence, the translation movement control applies a signal to the X control 33 and the plus/minus control applies a minus signal to the X control 33. Hence, the X control generates an output signal that causes the appropriate reaction jets to ignite and slowly move the vehicle in the X-minus direction.

If at any time in the operation of the system, it is desired to provide a stop signal, a stop command is given. A stop command is recognized by the voice recognizer 11 and causes it to generate an output signal on the stop line. When this occurs, the gate 43 generates a reset output signal which is applied to the axis movement control 21, the plus/minus control 23 and the translation movement control 25. This stop signal stops the operation of these controls. In addition, these controls will stop automatically if there is a failure to provide a plus or minus signal after a predetermined period of time has elapsed. That is, the plus/minus control applies a signal to the gate 43 when a predetermined period of time has elapsed after the last plus or minus command. When this condition occurs, an output or reset signal is applied by the gate to the axis movement control, the plus/minus control, and the translation movement control to reset these controls for a future command sequence. Hence, the word "stop" at any time removes all further maneuvering commands and clears the system for new commands. Alternatively, when a predetermined period of time after a prior sequence of commands has elapsed, the system automatically stops operating.

The cage control is provided so that a command can be given to place the gyros of the space vehicle in an attitude synchronous mode of operation. Hence, wide deadband limits can be selected. Any maneuvering command after a cage command, however, reactivates the system.

Figure 3:
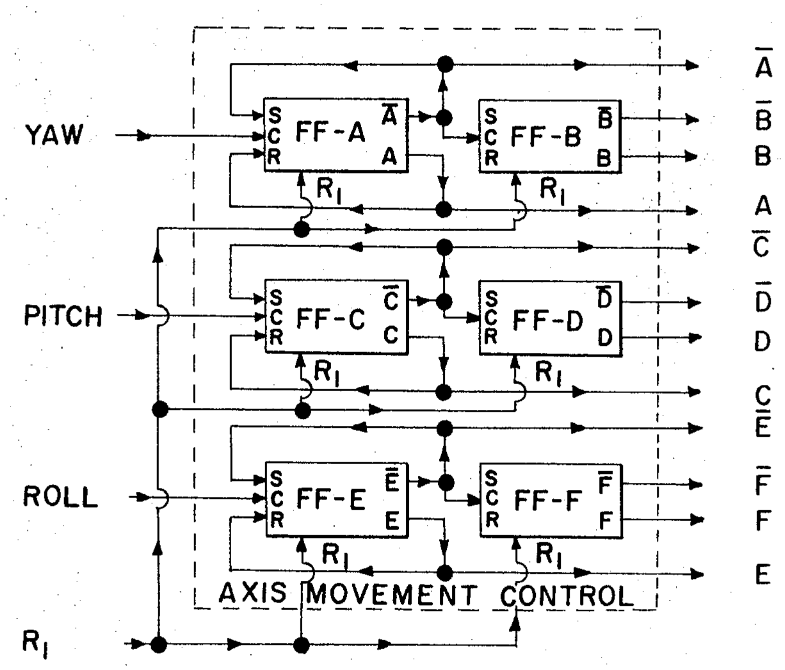
FIG. 3 is a block diagram of an axis movement control suitable for use in the control illustrated in FIG. 2.

Turning now to a description of the logic circuits illustrated in FIGS. 3 through 11, which are adapted to carry out the control functions of the subsystems illustrated in FIG. 2, and heretofore described, FIG. 3 is a block diagram of an axis movement control system suitable for use in the FIG. 2 control. The axis movement control illustrated in FIG. 3 comprises six flip-flops designated FF-A, FF-B, FF-C, FF-D, FF-E, and FF-F. Each flip-flop has a set (S) input, a clock (C) input, a reset (R) input, and a direct reset (R1) input. The set and reset inputs merely switch the state of the flip-flop if the flip-flop is not in the appropriate state when these inputs receive signals. If the flip-flop is in the appropriate state, no change occurs. However, when the clock input receives a signal, the state of the flip-flop changes, regardless of its previous state. Each flip-flop generates a true and a false output. The true output is the nonbarred output of the flip-flop and the false output is the barred output. For example, FF-A's true output is designated A and its false output is designated $\bar{A}$.

The yaw output of the voice recognizer 11 is connected to the clock input of FF-A. The A output of FF-A is connected to the reset input of FF-A and to an A output. The $\bar{A}$ output of FF-A is connected to the clock input of FF-B, the set input of FF-A and an $\bar{A}$ output. The B output of FF-B is connected to a B output terminal and the $\bar{B}$ output of FF-B is connected to a $\bar{B}$ output terminal.

The clock input of FF-C is connected to the pitch output of the voice recognizer 11 (FIG. 1). The C output of FF-C is connected to a C output terminal and to the reset input of FF-C. The $\bar{C}$ output of FF-C is connected to the clock input of FF-D, a $\bar{C}$ output terminal, and the set input of FF-C. The D output of FF-D is connected to a D output terminal and the $\bar{D}$ output of FF-D is connected to a $\bar{D}$ output terminal. The roll output of the voice recognizer is connected to the clock input of FF-E. The E output of FF-E is connected to an E output terminal and to the reset input of FF-E. The $\bar{E}$ output of FF-E is connected to the clock input of FF-F to an $\bar{E}$ output terminal and to the set input of FF-E. The $\bar{F}$ output of FF-F is connected to an $\bar{F}$ terminal. The F output of FF-F is connected to an F output terminal. The direct reset (R1) input terminal is connected to the R1 inputs of FF-A, FF-B, FF-C, FF-D, FF-E and FF-F.

Figure 6:
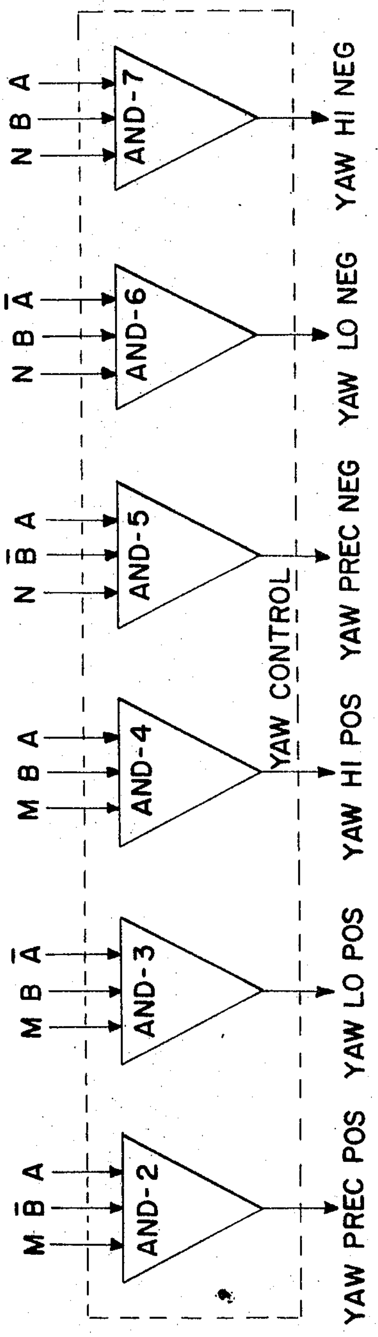
FIG. 6 is a block diagram of a yaw control suitable for use in the control illustrated in FIG. 2.

It will be appreciated from the foregoing description that FF-A and FF-B comprise a two stage counter for counting yaw pulses; similarly FF-C and FF-D comprise a two stage counter for counting pitch pulses, and FF-E and FF-F comprise a two stage counter for counting roll pulses. Hence, up to three pulses can be counted for each command. For example, if a yaw-yaw-yaw command is given, three pulses are applied to the clock input of FF-A. These pulses are counted with the result that output signals occur on the A and B outputs of FF-A and FF-B, respectively. Alternatively, if only a single yaw command is given, output signals occur on the A and $\bar{B}$ outputs of FF-A and FF-B, respectively. Finally, if a yaw-yaw command is given, outputs occur on the $\bar{A}$ and B outputs of FF-A and FF-B, respectively. By suitably interpreting these signals a precession, a low or a high output control signal is generated. Further, by including the interpretation with an interpretational positive or negative signal, a directional control signal is generated. The pitch and roll outputs are interpreted in the same manner. FIG. 6, as hereinafter described, illustrates a yaw control for performing the desired interpretation along the yaw axis.

Figure 4:
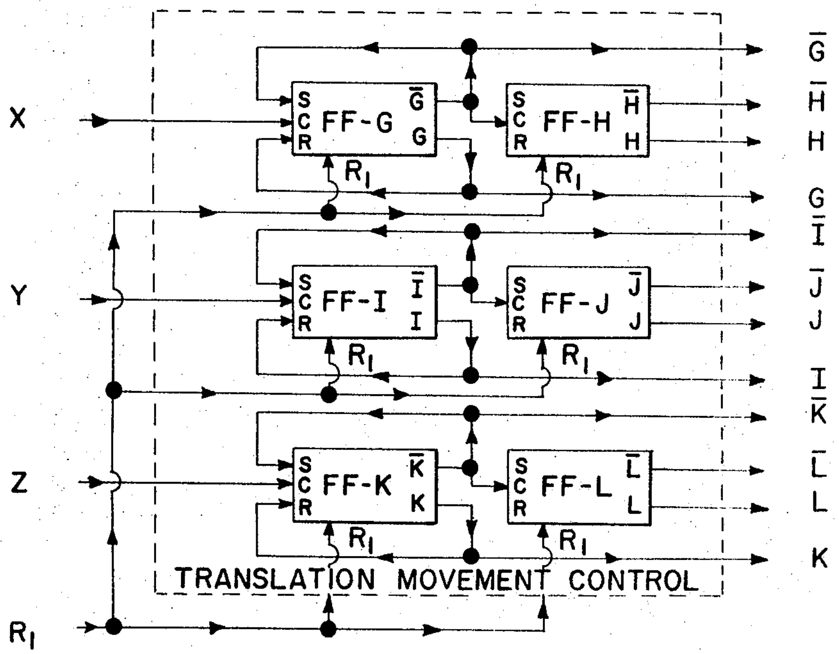
FIG. 4 is a block diagram of a translation movement control suitable for use in the control illustrated in FIG. 2.

FIG. 4 is a block diagram illustrating a translation movement control suitable for use in the embodiment of the invention illustrated in FIG. 2. The translation movement control illustrated in FIG. 4 comprises six flip-flops designated FF-G, FF-H, FF-I, FF-J, FF-K and FF-L. All of these flip-flops are similar to the flip-flops contained in the axis movement control heretofore described. The X output of the voice recognizer 11 is connected to the clock input of FF-G. The G output of FF-G is connected to a G output terminal and to the reset input of FF-G. The $\bar{G}$ output of FF-G is connected to the clock input of FF-H, to a $\bar{G}$ output terminal, and to the set input of FF-G. The $\bar{H}$ output of FF-H is connected to an $\bar{H}$ output terminal and the H output of FF-H is connected to an H output terminal.

The Y output of the voice recognizer is connected to the clock input of FF-I. The I output of FF-I is connected to an I output terminal and to the reset input of FF-I. The $\bar{I}$ output of FF-I is connected to the clock input of FF-J, to an $\bar{I}$ output terminal and to the set input of FF-I. The J output of FF-J is connected to a J output terminal and the $\bar{J}$ output of FF-J is connected to a $\bar{J}$ output terminal.

The Z output of the voice recognizer is connected to the clock input of FF-K. The K output of FF-K is connected to the reset input of FF-K and to a K output terminal. The $\overline{K}$ output of FFnK is connected to a clock input of FF-L, a $\overline{K}$ output terminal, and the set input of FF-K. The L output of FF-L is connected to an L output terminal and the $\overline{L}$ output of FF-L is connected to an $\overline{L}$ output terminal. The direct reset (R1) inputs of FF-G, FF-H, FF-I, FF-J, FF-K and FF-L are connected to an Rl input terminal.

FF-G and FF-H form a two stage counter for X pulses, FF-I and FF-J form a two stage counter for Y pulses and FF-K and FF-L form a two stage counter of Z pulses. The operation of the translation movement control illustrated in FIG. 4 is identical to the operation of the axis movement control illustrated in FIG. 3 heretofore discussed where X = yaw, Y = pitch and Z = roll; hence, a complete discussion of the operation of the translation movement control would be merely repetitive and is, therefore, not provided.

Figure 5:
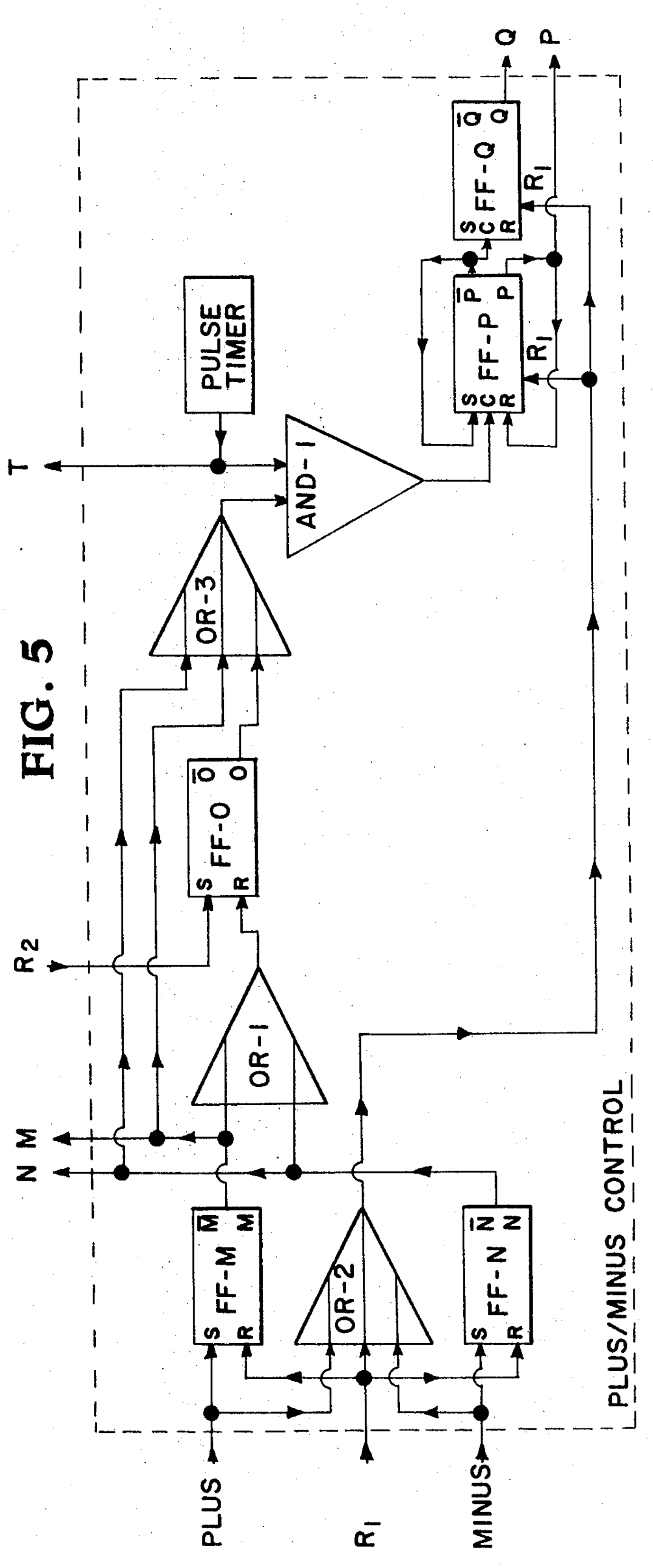
FIG. 5 is a block diagram of a plus/minus control suitable for use in the control illustrated in FIG. 2.

FIG. 5 is a block diagram of a plus/minus control suitable for use in the control illustrated in FIG. 2. The plus/minus control illustrated in FIG. 5 comprises: five flip-flops designated FF-M, FF-N, FF-O, FF-P, and FF-Q; a pulse timer; one two-input OR gate designated OR-l; two three-input OR gates designated OR-2, and OR-3; and a two-input AND gate designated AND-1. The flip-flops are of the type heretofore described; however, some of the inputs (which are not connected or used) are not illustrated in FIG. 5, for purposes of clarity. For example, the clock inputs are not illustrated on FF-M, FF-N, and FF-O, because they are not used.

The plus output from the voice recognizer 11 (FIG. 1) is connected to the set input of FF-M and to one input OR-2. The minus' output from the voice recognizer is connected to the set input of FF-N and one input of OR-2. The third input of OR-2 is connected to an R1 (reset) input terminal. The R1 terminal is also connected to the reset inputs of FF-M and FF-N. The M output of FF-M is connected to one input of OR-1 and the N output of FF-N is connected to the second input of OR-1. The output of OR-1 is connected to the reset input of FF-O. The set input of FF-O is connected to an input terminal designated R2 which is also a reset signal, but from a different source than the R1 reset signal source. The M output of FF-M is connected to one input of OR-3 and the N output of FF-N is connected to a second input of OR-3. The third input of OR-3 is connected to the O output of FF-O.

The output of OR-3 is connected to one input of AND-1. The second input of AND-1 is connected to the output of the pulse timer. The pulse timer is also connected to an output terminal designated T. The output of AND-1 is connected to the clock input of FF-P. The P output of FF-P is connected to a P output terminal and to the reset input of FF-P. The $\overline{P}$ output of FF-P is connected to the clock input of FF-Q and the set input of FF-P. The Q output of FF-Q is connected to a Q output terminal. The output of OR-2 is connected to the direct reset (R1) inputs of FF-P and FF-Q.

In general, the plus/minus control as illustrated in FIG. 5 is adapted to interpret plus or minus signals. For example, if a plus signal is generated by the voice recognizer, FF-M is set and generates an output on its M line. This signal in combination with yaw or other control signals of the type previously described determines that the space vehicle should move in a positive direction at the rate determined by the number of yaw, roll or pitch commands given. Alternatively, if a minus signal is generated, FF-N generates a signal on its N line. This signal is also interpreted as hereinafter described to control movement in the minus or negative direction. FF-P and FF-P count pulses from the pulse timer and apply these signals to a gating means of the type illustrated in FIG. 10 which, as hereafter described, turns on the overall system if a further plus or minus signal is not repeated within the duration of three output pulses generated by the pulse timer.

FIG. 6 is a block diagram of a yaw control suitable for use in the embodiment of the invention illustrated in FIG. 2. The pitch and roll controls are identical to the yaw control illustrated in FIG. 6. Hence, to eliminate redundancy, only the yaw control is herein described. The yaw control illustrated in FIG. 6 comprises six three-input AND gates designated AND-2, AND-3, AND-4, AND-5, AND-6, and AND-7. AND-2 receives A, $\overline{B}$ and M inputs. AND-3 receives $\overline{A}$, B and M inputs. AND-4 receives A, B and M inputs. AND-5 receives A, $\overline{B}$ and N inputs. AND-7 receives A, B and N inputs. More specifically, these AND gates are connected to the just set forth outputs of the FF-A, FF-B, FF-M and FF-N flip-flops. Hence, these AND gates interpret the outputs of those flip-flops. For example, if three yaw signals and a plus signal (yaw-yaw-yaw-plus) are applied by the voice recognizer to the axis movement, control 21 and the plus/minus control 23, respectively, FF-A will generate an output on line A, FF-B will generate an output on line B and FF-M will generate an output on line M. For this set of outputs, AND-4 is energized and a "yaw hi pos" signal occurs. Alternatively, if a yaw-yaw-plus set of outputs are applied to the yaw control, AND–2 generates an output signal which is a yaw precession positive (yaw prec pos) signal. Finally, if a yaw-plus command is given, AND-3 generates an output signal which is designated a yaw low positive signal. Alternatively, if the suffix to the yaw command is minus, AND-5 through AND-7 are energized in accordance with the number of yaws preceding the suffix.

Figure 7:
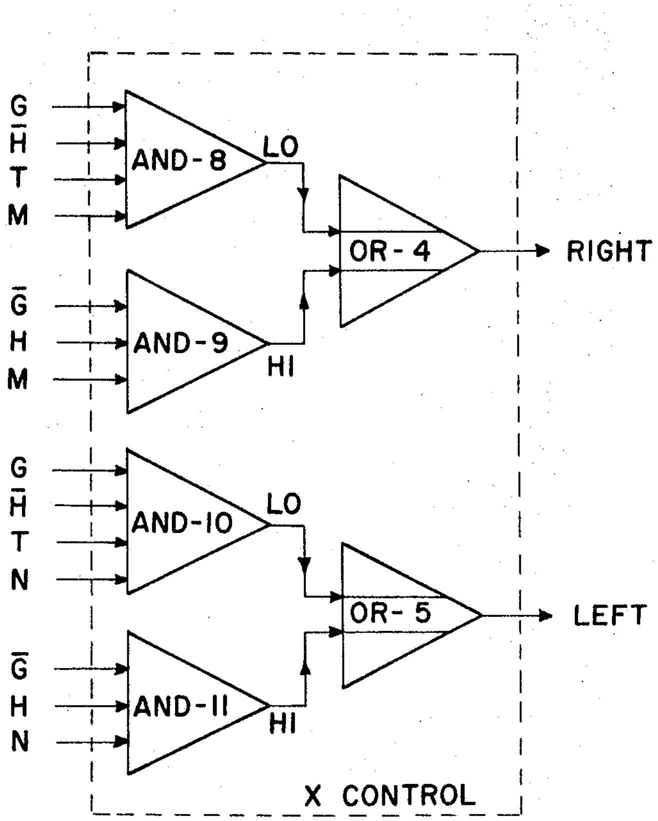
FIG. 7 is a block diagram of an X control suitable for use in the control illustrated in FIG. 2.

FIG. 7 illustrates an X control for interpreting the outputs of the translation movement control and the plus/minus control for translation movement, i.e., in an X, Y or Z direction. The Y and the Z controls 35 and 37 (FIG. 2) are identical to the X control illustrated in FIG. 7; hence, for purposes of simplicity only the X control is herein described.

The X control illustrated in FIG. 7 comprises: four AND gates designated AND-8, AND-9, AND-10, and AND-11, and two two-input OR gates designated OR-4 and OR-5. AND-8 and AND-10 are four-input AND gates and AND-9 and AND-11 are three-input AND GATES. AND-8 receives G, $\overline{H}$, T and M inputs, AND-9 receives $\overline{G}$, H, and M inputs. AND-10 receives G. $\overline{H}$, T and N inputs, and AND-11 receives $\overline{G}$, H and N inputs. The output of AND-8 and the output of AND-9 are connected to the inputs of OR-4. OR-4 is connected to a "right" output terminal. The outputs of AND-10 and AND-11 are connected to the two inputs of OR-5 and the output of OR-5 is connected to a "left" output terminal.

In operation, when all of the inputs to any of the AND gates are positive, that gate generates an output signal that is either a right or a left signal and is applied through the appropriate OR gate to suitable control jets. For example, if AND-8 receives G, $\overline{H}$, T and M signals, it generates an output signal which is designated low movement to the right. This signal passes through OR-4 and controls the appropriate reaction jet or jets. The pulse timer which produces the T pulse is included as an input in AND-8 to limit the output of AND-8 to a short period of time. Hence, AND-8 generates, as previously stated, a signal creating low or small movement. AND-9 does not have a T input; hence, it generates an output signal when the command given is X-X-plus. For this command, $\overline{G}$ and H outputs occur as well as an M output. These outputs are interpreted by AND-9 so that a signal is applied through OR-4 to the appropriate jet or jets to cause a right directional movement which is larger than the movement created when an output signal from AND-8 occurs. AND-10 and AND-11 operate similarly to AND-8 and AND-9, respectively, except that movement is to the left.

Figure 8:
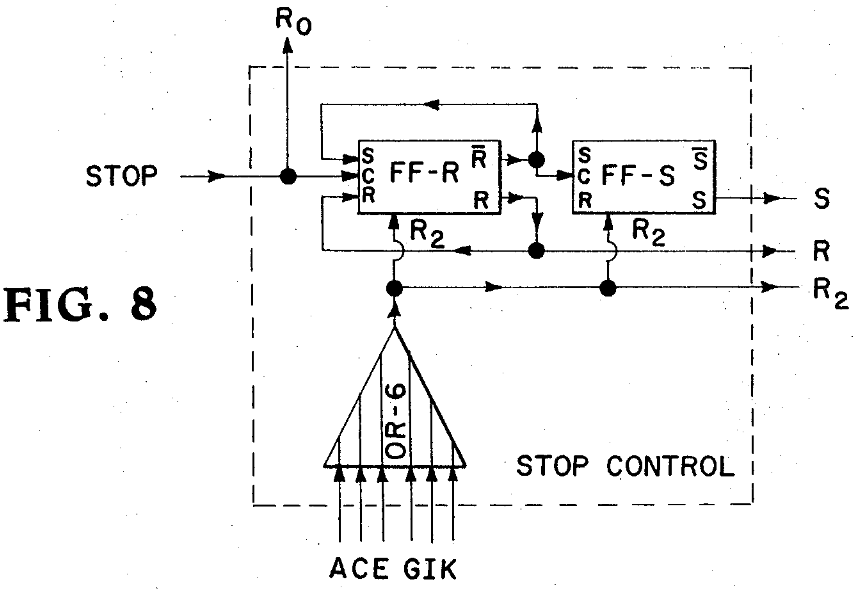
FIG. 8 is a block diagram of a stop control suitable for use in the control illustrated in FIG. 2.

FIG. 8 is a block diagram of a stop control suitable for use in the embodiment of the invention illustrated in FIG. 2. The stop control illustrated in FIG. 8 comprises two flip-flops designated FF-R and FF-S; and, a six input OR gate designated OR-6. OR-6 receives A, C, E, G, I and K inputs from the appropriate flip-flop outputs. The stop input from the voice recognizer applied to the clock input of FF-R into an output terminal is designated RO. The R output of FF-R is connected to an output terminal designated R and to the reset input of FF-R. The $\overline{R}$ output of FF-R is connected to the clock input of FF-S, and to the set input of FF-R. The output of OR-6 is connected to the direct reset (R2) inputs of FF-R and FF-S. The output OR-6 is also connected to an output terminal designated R2 which, as will be understood from the previous description of FIG. 5, is connected to the set input of FF-O. The S output of FF-S is connected to an S output terminal.

In operation, any time an A, C, E, G, I or K signal is generated, FF-R and FF-S are reset. In addition, FF-O of the plus/minus control is reset. This condition occurs each time a rotation or a translation signal is recognized by the voice recognizer 11. For example, when the first yaw command is given, an input signal is applied to FF-A which causes an A output signal to occur. This signal resets FF-R and FF-S as well as FF-O. Similarly, if a pitch, roll, X, Y or Z command is given, these flip-flops are reset. Thereafter, if a stop command is given, FF-R is clocked to cause its reset output to apply a signal to FF-S. When this occurs, an S output signal is generated. In addition, an RO signal is generated which passes through the gate illustrated in FIG. 10, hereinafter described, to cause an R1 signal to be generated, which resets all of the flip-flops having R1 reset inputs.

Figure 9:
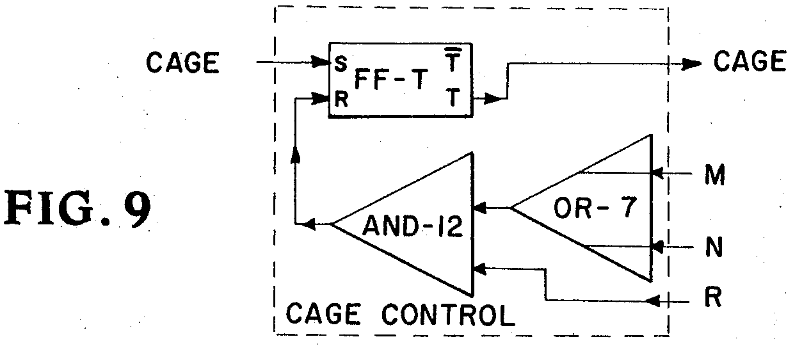
FIG. 9 is a block diagram of a cage control suitable for use in the control illustrated in FIG. 2.

FIG. 9 is a block diagram of a cage control suitable for use in the control system illustrated in FIG. 2. The cage control illustrated in FIG. 9 comprises a flip-flop designated FF-T; a two-input OR gate designated OR-7; and a two-input AND gate designated AND-12. The cage output of the voice recognizer 11 is connected to the set input of FF-T. The T output of FF-T is connected to a cage output terminal. OR-7 receives M and N outputs from the FF-M and FF-N flip-flops of the plus/minus control. The output from OR-7 is connected to one input of AND-12. The other input of AND-12 is connected to the R output of the stop control illustrated in FIG. 8. The output of AND-12 is connected to the reset input of FF-T.

In operation, the cage control is adapted to generate a cage output signal when a cage command is given which is utilized by the deadband control, hereinafter described, to cage the entire system until a further command is spoken. When any other command is spoken, after a cage command, FF-R is reset and an R signal is applied to AND-12. In addition, either an M or an N signal is applied through OR-7 to the second input of AND-12. When AND-12 receives two inputs, it applies a reset input to FF-T which resets that flip-flop and ends cage operation.

Figure 10:
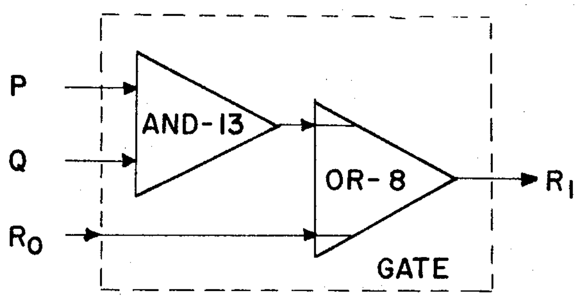
FIG. 10 is a block diagram of a gate control suitable for use in the control illustrated in FIG. 2; and, FIG. 11 is a block diagram of a deadband control suitable for use in the control illustrated in FIG. 2.

FIG. 10 is a gate suitable for use in the control system illustrated in FIG. 2 and comprises: a two-input AND gate designated AND-13; and, a two-input OR gate designated OR-8. AND-13 receives P and Q signals from the FF-P and the FF-Q flip-flops of the plus/minus control. The output from AND-13 is connected to one input of OR-8. The second input of OR-8 is connected to an R1 output terminal, and the R1 output terminal is connected to the R1 inputs of the previously described flip-flops. Hence, when either an RO signal is generated which occurs when a stop command is given, or when P, Q outputs are generated, an R1 signal is generated to reset the overall system. In effect, this means that either after a sequence of commands has been carried out, or after a stop command is given, the overall system is reset.

Figure 11:
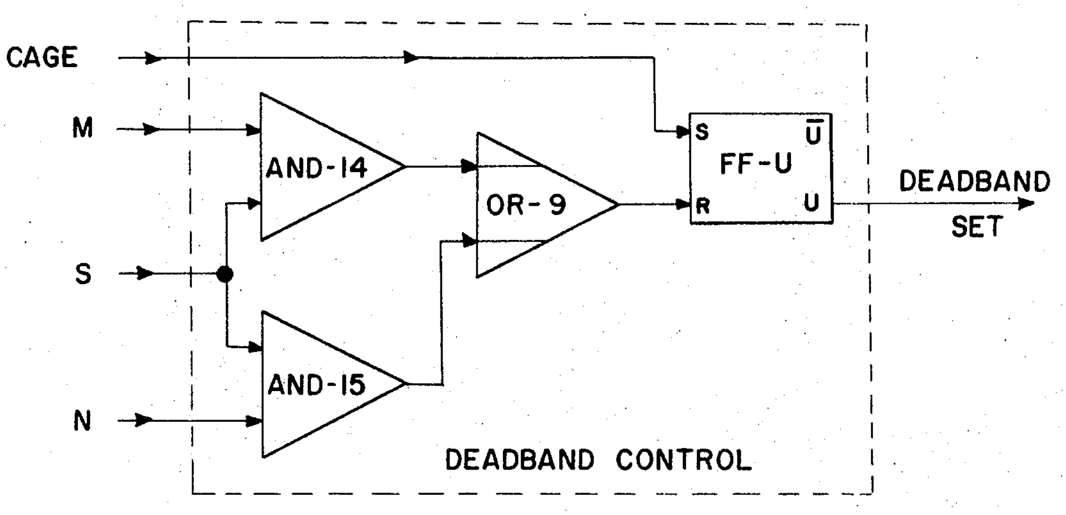

FIG. 11 is a block diagram that illustrates a deadband control suitable for use in the embodiment of the invention illustrated in FIG. 2. The deadband control illustrated in FIG. 11 comprises: two two-input AND gates designated AND-14 and AND-15; a two-input OR gate designated OR-9; and a flip-flop designated FF-U. The cage output of the cage control is connected to the set input of FF-U. M and S outputs are connected to the inputs of AND-14 and N and S outputs are connected to the inputs of AND-15. The outputs of AND-14 and AND-15 are connected to the separate inputs of OR-9 and the output of OR-9 is connected to the reset input of FF-U. In operation, when the cage control generates a cage signal at its output terminal, FF-U is set and a deadband set output signal is generated. This signal occurs at the U output of FF-U. Thereafter, when an M or N signal (i.e., positive or negative) command is given without a stop command being given, either AND-14 or AND-15 generates an output signal that resets FF-U.

It will be appreciated from the foregoing description that a voice controller suitable for use with a spacecraft is provided by the invention. The invention requires a voice recognition circuit to recognize 10 voice commands. Upon the occurrence of each voice command, a pulse is generated along an appropriate output line. These pulses are interpreted by a controller and suitable control signals are generated. The control signals control the energization of reaction jets, which in turn control the movement of the spacecraft in either rotation or translation. If at any time it is desired to stop maneuvering the space vehicle, the pilot must merely voice a stOp command which resets the entire system. Alternatively, if desired, the system can be caged until an appropriate ungauging signal is generated.

It will be appreciated that the foregoing description has only described a preferred embodiment of the invention and that various other embodiments fall within the scope of the invention. For example, other types of gating arrangements can be utilized to provide appropriate gating signals for controlling the energization of the reaction jets. Hence, the invention can be practiced otherwise than as specifically described herein.

What I claim is:

l. A voice operated controller comprising:

a voice recognizer for recognizing axis, translation and directional voice commands and for generating signals in accordance with those commands;

a control connected to said voice recognizer for receiving the signals generated by said voice recognizer, for interpreting these signals, and for generating control signals suitable for controlling reaction jets;

said control includes an axis movement control connected to said voice recognizer to receive the signals generated by said voice recognizer when axis voice commands are recognized by said voice recognizer;

a translation movement control connected to said voice recognizer to receive the signals generated by said voice recognizer when translation voice commands are recognized by said voice recognizer; and a plus/minus control connected to said voice recognizer to receive the signals generated by said voice recognized when directional voice commands are recognized by said voice recognizer.

2. A voice operated controller as claimed in claim 1, wherein said controls include:

axis controls connected to said axis movement control and to said plus/minus control to interpret the output signals from the axis movement control and the plus/minus control; and, translation controls connected to said translation movement control and to said plus/minus control to interpret the output signals from the translation movement control and the plus/minus control.

3. A voice operated controller as claimed in claim 2, wherein said axis controls include:

a yaw control connected to said axis movement control and to said plus/minus control;

a pitch control connected to said axis movement control and to said plus/minus control; and, a roll control, connected to said axis movement control and to said plus/minus control; and wherein said translation control includes:

an X control connected to said translation movement control and to said plus/minus control;

a Y control connected to said translation movement control and to said plus/minus control; and a Z control connected to said translation movement control and to said plus/minus control.

4. A voice operated controller as claimed in claim 3, wherein said control also includes:

a stop control connected to said voice recognizer to receive the signals generated by said voice recognizer when stop voice commands are recognized by said voice recognizer; and a gate connected to said stop control and to said plus/minus control for generating a stop signal upon the receipt of suitable input signals, the output of said gate being connected to said axis movement control, said plus/minus control, and said translation movement control so as to stop the operation of these controls upon the occurrence of a stop signal.

5. A voice operated controller as claimed in claim 4, wherein said control also includes:

a cage control connected to said voice recognizer to receive the signals generated by said voice recognizer when cage voice commands are recognized by said voice recognizer; and, a deadband control connected to said cage control and to said stop control to provide an appropriate deadband after a cage command is recognized.

6. A voice operated controller as claimed in claim 4, wherein said voice recognizer generated pulse signals and wherein said axis movement control and said translation movement control all comprise a plurality of flip-flops connected so as to count the pulses generated by said voice recognizer when said voice recognizer receives yaw, pitch, roll, X, Y, and Z commands.

7. A voice operated controller as claimed in claim 6, wherein said plus/minus control includes first and second flip-flops connected so as to receive the pulses resulting from plus and minus voice commands being recognized by said voice recognizer and to apply appropriate directional pulses to the yaw, pitch, roll, X, Y, and Z controls.

8. A voice operated controller as claimed in claim 7, wherein said yaw, pitch and roll controls each comprise a plurality of AND gates connected to the outputs of the flip-flops of said axis movement control and to said first and second flip-flops of said plus/minus control in a predetermined manner so as to generate outputs on separate lines when a predetermined set of output pulses are generated by said flip-flops.

9. A voice operated controller as claimed in claim 8, wherein said X, Y, and Z controls each comprise a plurality of AND gates and OR gates connected to said flip-flops of said translation movement control and said first and second flip-flops of said plus/minus control in a predetermined manner so as to generate output signals on separate lines when a predetermined set of output pulses are generated by said flip-flops.